(12) United States Patent
Hara

(10) Patent No.: US 11,808,198 B2
(45) Date of Patent: Nov. 7, 2023

(54) COOLING FAN CONTROL DEVICE, COOLING DEVICE, AND COOLING FAN CONTROL METHOD

(71) Applicant: Caterpillar SARL, Geneva (CH)

(72) Inventor: Keigo Hara, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/763,618

(22) PCT Filed: Sep. 18, 2020

(86) PCT No.: PCT/EP2020/025423
§ 371 (c)(1),
(2) Date: Mar. 24, 2022

(87) PCT Pub. No.: WO2021/058126
PCT Pub. Date: Apr. 1, 2021

(65) Prior Publication Data
US 2022/0290605 A1    Sep. 15, 2022

(30) Foreign Application Priority Data

Sep. 25, 2019  (JP) .................................. 2019-174448

(51) Int. Cl.
*F01P 7/04* (2006.01)
*F01P 5/02* (2006.01)

(52) U.S. Cl.
CPC ................. *F01P 7/048* (2013.01); *F01P 5/02* (2013.01)

(58) Field of Classification Search
CPC .......... F01P 7/048; F01P 5/02; F02B 29/0456
See application file for complete search history.

(56) References Cited

U.S. PATENT DOCUMENTS

| 4,377,989 A | 3/1983 | Tholen et al. |
| 2007/0261648 A1* | 11/2007 | Reckels ................ F01P 7/167 123/41.12 |

(Continued)

FOREIGN PATENT DOCUMENTS

| CN | 101010497 A | 8/2007 |
| CN | 105525976 A | 4/2016 |

(Continued)

OTHER PUBLICATIONS

International Search Report related to Application No. PCT/EP2020/025423; dated Dec. 7, 2020.

(Continued)

*Primary Examiner* — Long T Tran

(57) ABSTRACT

To provide such a cooling fan control device, a cooling device, and a cooling fan control method that can cool a heat exchanger appropriately according to an air density. A cooling fan control device controls a rotation speed of a cooling fan being driven by power supplied from an alternator and cooling the heat exchanger. The cooling fan control device comprises a density detection means detecting the air density. The cooling fan control device comprises a controller, where the smaller the air density detected by the density detection means is, the greater an upper limit of target rotation speed of the cooling fan is set, as long as power consumption of the cooling fan does not exceed a power capacity of a power supply source.

6 Claims, 5 Drawing Sheets

(56) References Cited

U.S. PATENT DOCUMENTS

2014/0209047 A1 7/2014 Hagman et al.
2015/0345370 A1 12/2015 Biagini et al.
2018/0086292 A1* 3/2018 Petrak .................... B60K 31/00

FOREIGN PATENT DOCUMENTS

| | | |
|---|---|---|
| JP | 2010150968 A | 7/2010 |
| JP | 2017072100 A | 4/2017 |
| JP | 2018009517 A | 1/2018 |
| SE | 1051168 A1 | 5/2012 |
| WO | 2013029794 A1 | 3/2013 |

OTHER PUBLICATIONS

Chinese Office Action for Chinese Patent Appln. No.202080066395.9, dated Jun. 1, 2023 (10 pgs).
Japanese Office Action for Japanese Patent Appln. No.2019-174448, dated Jul. 5, 2023 (3 pgs).

* cited by examiner

COOLING FAN CONTROL DEVICE, COOLING DEVICE, AND COOLING FAN CONTROL METHOD

CROSS-REFERENCE TO RELATED APPLICATION

This Application is a 35 USC § 371 US National Stage filing of International Application No. PCT/EP2020/025423 filed on Sep. 18, 2020 which claims priority under the Paris Convention to Japanese Patent Application No. 2019-174448 filed on Sep. 25, 2019.

FIELD OF THE INVENTION

The present invention relates to a cooling fan control device, a cooling device and a cooling fan control method for controlling a rotation speed of a cooling fan cooling a heat exchanger.

BACKGROUND ART

A working machine such as a hydraulic excavator is installed with a radiator for cooling an engine; an oil cooler for cooling hydraulic oil to be fed to/discharged from each hydraulic actuator; and a cooling package as a cooling unit comprising heat exchangers such as an aftercooler for cooling engine intake air compressed by a turbocharger and electric cooling fans corresponding to each heat exchanger. Each cooling fan separately controls the rotation speed, that is, a fan speed. Conventionally, an upper fan speed limit is predetermined for each cooling fan lest the cooling fan exceed a current capacity of an alternator as a power supply source (see PTL 1, for example).

CITATION LIST

Patent Document

PTL 1: Japanese Unexamined Patent Application Publication No. 2018-9517

SUMMARY OF THE INVENTION

Problems to be Solved by the Invention

Generally, since the upper fan speed limit is set according to standard specification or application, it is desirable to prevent the heat exchanger from running short of cooling capacity in a working environment deviating from the standard specification. Since a cooling performance particularly of a radiator and the like drops under an environment with small air density, at a highland for example, sufficient cooling effect may not be obtained with the upper fan speed limit set under standard working environment, so further improvement may be desirable.

This invention is conceived to address the problem, and is intended to provide such a cooling fan control device, a cooling device, and a cooling fan control method that can cool the heat exchanger appropriately according to an air density.

Means for Solving the Problem

The invention defined in claim 1 provides a cooling fan control device for controlling a rotation speed of a cooling fan being driven by power supplied from a power supply source and cooling a heat exchanger, comprising: a density detection means for detecting an air density; and a rotation speed setting means, where the smaller the air density detected by the density detection means is, the greater an upper limit of target rotation speed of the cooling fan is set, as long as power consumption of the cooling fan does not exceed a power capacity of the power supply source.

The invention defined in claim 2 provides the cooling fan control device defined in claim 1, wherein, when the air density detected by the density detection means is greater than a prescribed value, the rotation speed setting means of the cooling fan control device sets the upper limit of target rotation speed of the cooling fan to a prescribed target upper limit rotation speed predetermined according to the power capacity of the power supply source; and when the air density detected by the density detection means is not greater than the prescribed value, the means can set the upper limit of target rotation speed of the cooling fan to greater than the prescribed target upper limit rotation speed.

The invention defined in claim 3 provides the cooling fan control device defined in claim 1 or 2, wherein the density detection means of the cooling fan control device is an air pressure sensor.

The invention defined in claim 4 provides a cooling device comprising: an alternator as a power supply source, a heat exchanger, a cooling fan being driven by power generated by the alternator and cooling the heat exchanger, and the cooling fan control device defined in any of claims 1 to 3 for controlling each rotation speed of the cooling fan.

The invention defined in claim 5 provides the cooling device defined in claim 4, wherein the heat exchanger of the cooling device comprises the radiator and the cooling fan comprises a radiator fan cooling the radiator.

The invention defined in claim 6 provides a cooling fan control method for controlling a rotation speed of a cooling fan being driven by power supplied from a power supply source and cooling a heat exchanger, wherein the method detects an air density, so that the smaller the air density detected is, the greater an upper limit of target rotation speed of the cooling fan is set, as long as power consumption of the cooling fan does not exceed a power capacity of the power supply source.

The invention defined in claim 7 provides the cooling fan control method defined in claim 6, wherein, when the air density detected is greater than a prescribed value, the method sets the upper limit of target rotation speed of the cooling fan to a prescribed target upper limit rotation speed predetermined according to the power capacity of the power supply source; and when the air density detected is not greater than the prescribed value, the method can set the upper limit of target rotation speed of the cooling fan to greater than the prescribed target upper limit rotation speed.

Favorable Effects of the Invention

According to the invention of claim 1, even when the air density is small and cooling power of the heat exchanger drops, the dropped cooling power of the heat exchanger may be covered by setting the upper limit of target rotation speed of the cooling fan greater, so that the heat exchanger may be appropriately cooled according to the air density.

According to the invention of claim 2, the upper limit of target rotation speed of the cooling fan may be changed under environments with both relatively greater and smaller air densities, so that the heat exchanger may be appropriately cooled according to the respective environment.

According to the invention of claim 3, the heat exchanger may be appropriately cooled at the highland.

According to the invention of claim 4, the cooling device can be provided that can cool the heat exchanger with the cooling fan appropriately according to the air density without upsizing the alternator.

According to the invention of claim 5, the radiator can be appropriately cooled whose cooling power changes a lot according to the change of the air density.

According to the invention of claim 6, even when the air density is small and the cooling power of the heat exchanger drops, the dropped cooling power may be covered by setting the upper limit of target rotation speed of the cooling fan greater, so that the heat exchanger may be appropriately cooled according to the air density.

According to the invention of claim 7, the upper limit of target rotation speed of the cooling fan may be changed under environments with both relatively greater and smaller air densities, so that the heat exchanger may be appropriately cooled according to the respective environment.

DETAILED DESCRIPTION OF THE INVENTION

Now, an explanation will be provided in detail about this invention based on an embodiment shown in FIGS. 1 to 5.

Figure 1:
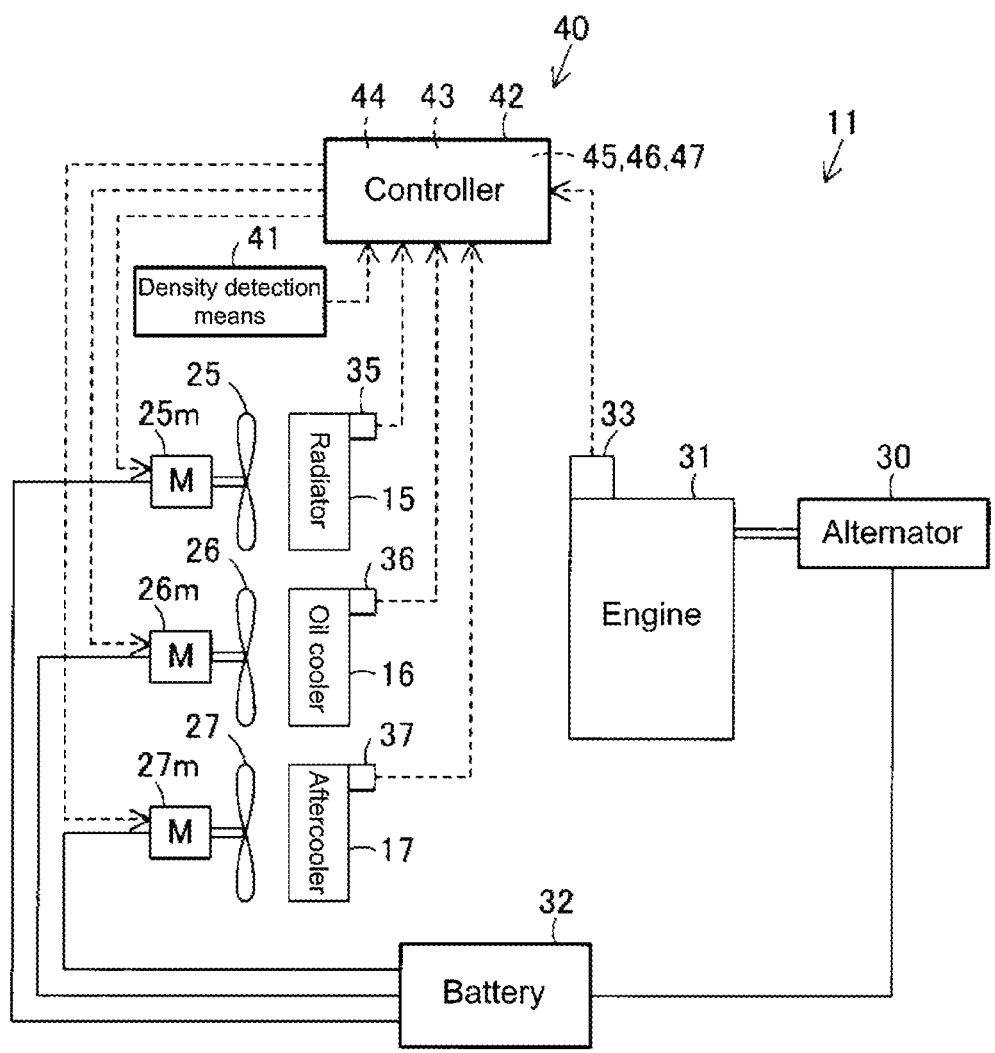
FIG. 1 is a block diagram illustrating an embodiment of the cooling device comprising the cooling fan control device according to the present invention.

In FIG. 1, a number 11 indicates the cooling device. The cooling device 11 according to this embodiment is one for working machine such as the hydraulic excavator. The cooling device 11 comprises multiple heat exchangers to be cooled. In the present embodiment, the heat exchanger has the radiator 15 as the first heat exchanger for passing engine cooling water, the oil cooler 16 as the second heat exchanger for passing hydraulic oil to be fed to/discharged from hydraulic actuator, and the aftercooler 17 as the third heat exchanger for passing compressed air from a turbocharger (not shown).

Also, the cooling device 11 comprises the cooling fan disposed on each heat exchanger. That is, the cooling device 11 comprises multiple cooling fans. The cooling fan is disposed opposite to each heat exchanger. The cooling fan is driven by a driving means. The driving means is the electric driving means and is driven by power supplied from the power supply source. That is, the cooling fan according to the present embodiment is an electric fan. In the present embodiment, as for the cooling fan, there are a radiator fan 25 as the first cooling fan for cooling the radiator 15, an oil cooler fan 26 as the second cooling fan for cooling the oil cooler 16, and an aftercooler fan 27 as the third cooling fan for cooling the aftercooler 17. Also, as for the driving means, there are a radiator fan electric motor 25m as a first electric motor for driving the radiator fan 25, an oil cooler fan electric motor 26m as a second electric motor for driving the oil cooler fan 26, and an aftercooler fan electric motor 27m as a third electric motor for driving the aftercooler fan 27.

As for the power supply source for supplying power to the driving means, an alternator 30 is used. The alternator 30 is configured to generate power by being coupling with an output shaft of engine 31 and being driven by the engine 31 and store generated electricity in a battery 32. The rotation speed of alternator 30 is set according to the rotation speed of the engine 31, so the higher the rotation speed of the alternator 30 is, the greater the generated current is. In general, the rotation speeds of engine 31 and alternator 30 have a positive correlation with each other, and in this embodiment, the rotation speeds of the engine 31 and alternator 30 have a proportional relationship. The battery 32 is electrically connected with electric motors 25m, 26m, and 27m and the power generated by the alternator 30 is supplied via the battery 32 to electric motors 25m, 26m, and 27m. Also, the rotation speed of the engine 31 is detected by a rotation speed detection means 33.

Also, the cooling device 11 comprises a temperature sensor disposed on each heat exchanger. That is, the cooling device 11 comprises multiple temperature sensors. The temperature sensor obtains directly or indirectly the temperature of each heat exchanger or information relevant to the temperature of a fluid passing through each heat exchanger. In this embodiment, as for the temperature sensor, there are a first temperature sensor 35 for the radiator 15, a second temperature sensor 36 for the oil cooler 16, and a third temperature sensor 37 for the aftercooler 17. In the present embodiment, the first temperature sensor 35 detects directly or indirectly the temperature of the engine cooling water passing through the radiator 15. Also, the second temperature sensor 36 detects directly or indirectly the temperature of hydraulic oil passing through the oil cooler 16. Additionally, the third temperature sensor 37 detects directly or indirectly the temperature of air passing through the aftercooler 17.

Furthermore, the cooling device 11 comprises a cooling fan control device 40. The cooling fan control device 40 controls the rotation speed (fan speed) of multiple cooling fans respectively. In the present embodiment, the cooling fan control device 40 controls the rotation speed of fans 25, 26, and 27, namely the rotation speed of electric motors 25m, 26m, and 27m respectively. The cooling fan control device 40 comprises a density detection means 41 detecting the air density and a controller 42.

The density detection means 41 is an air pressure sensor, for example. That is to say, the density detection means 41 detects the air density in the working environment of working machine. In the present embodiment, the density detection means 41 detects the air density at a place at least where the cooling fan is disposed.

The controller 42 may be comprised of computer. The controller 42 is electrically connected to the cooling fan driving means, temperature sensor, density detection means 41, and others. In the present embodiment, the controller 42 is electrically connected to the radiator fan electric motor 25m, the oil cooler fan electric motor 26m, the aftercooler fan electric motor 27m, the rotation speed detection means 33, the first temperature sensor 35, the second temperature sensor 36, the third temperature sensor 37, the density detection means 41, and others.

Also, in the present embodiment, the controller 42 has a function as the rotation speed setting means. The controller 42 sets the target rotation speed of each cooling fan based on the power capacity of alternator 30, a sum of necessary power according to cooled state of the heat exchanger for each cooling fan, and the air density detected by the density detection means 41, as long as the power consumption of each cooling fan does not exceed the power capacity of the alternator 30. In the present embodiment below, a word "electric power" is used as "electric current."

The controller 42 stores in advance the relationship table (FIG. 4) between the generated current of alternator 30 and the engine 31's rotation speed; a necessary current value for controlling other electrical components than electric motors 25m, 26m, and 27m for the fans 25, 26, and 27; the relationship tables between rotation speed of electric motors 25m, 26m, 27m and current value supplied to the electric motors 25m, 26m, 27m; the relationship tables T1, T2, and T3 (FIGS. 5(a) to 5(c)) between the rotation speeds NR, NO, NA of fans 25, 26, and 27 or electric motors 25m, 26m, and 27m and the temperatures TR, TO, and TA detected by the first to third temperature sensors 35, 36, and 37; and others.

Figure 4:
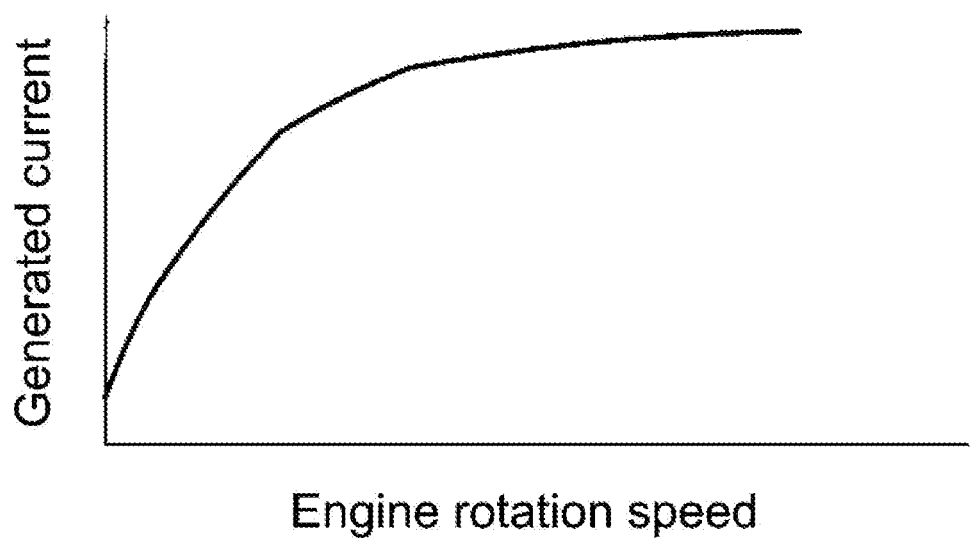
FIG. 4 is the explanatory drawing illustrating an example of a relationship table between a generated current from the power supply source and the engine's rotation speed in the cooling fan control device above.
Figure 5:
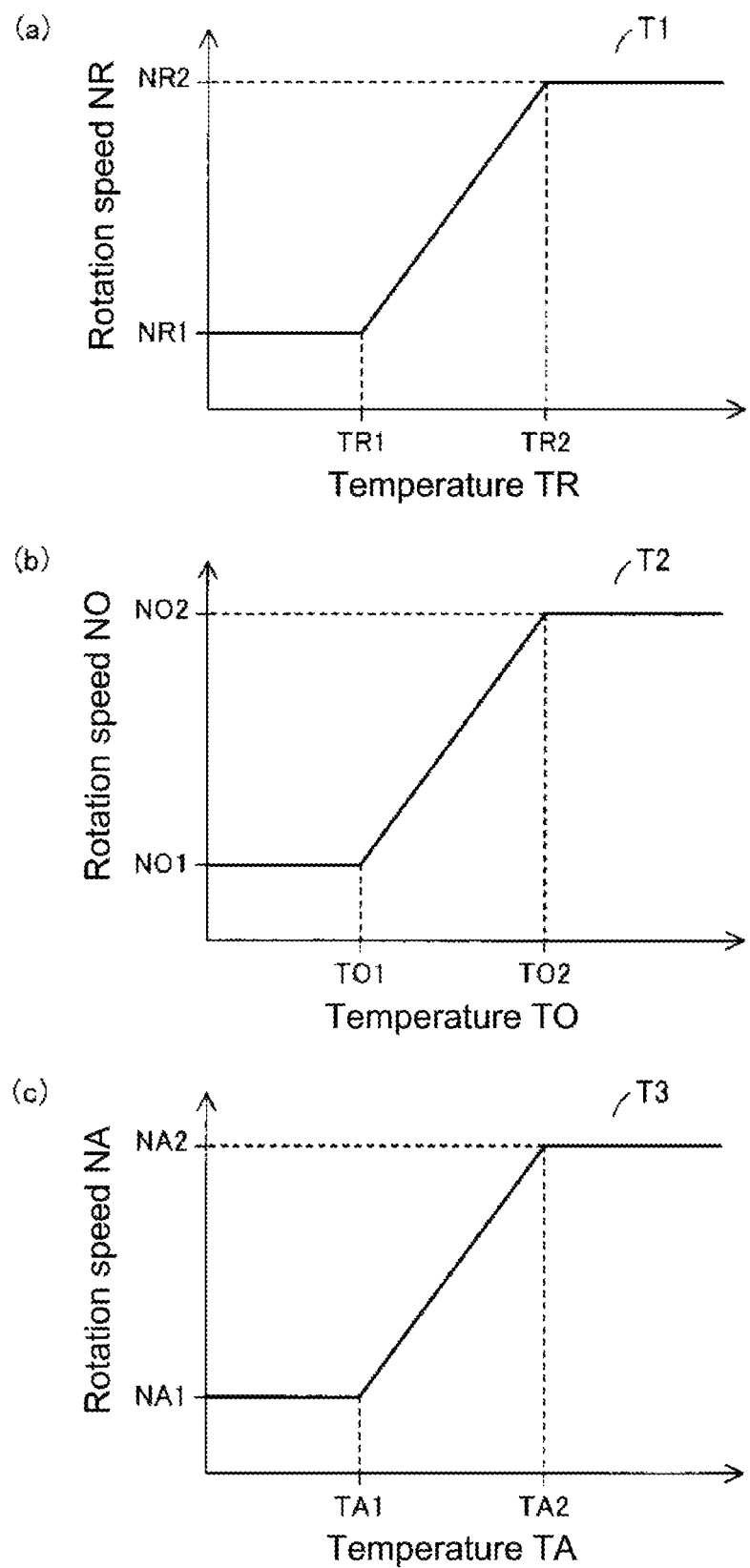
FIG. 5A is the explanatory drawing illustrating an example of the relationship table between necessary rotation speed of a first cooling fan and first heat exchanger's temperature in the cooling fan control device above.
FIG. 5B is the explanatory drawing illustrating an example of the relationship table between necessary rotation speed of a second cooling fan and second heat exchanger's temperature in the cooling fan control device above.
FIG. 5C is the explanatory drawing illustrating an example of the relationship table between necessary rotation speed of a third cooling fan and third heat exchanger's temperature in the cooling fan control device above.

As an example is shown in FIG. 4, basically, the generated current of the alternator 30 is positively correlated with the engine 31's rotation speed. Note that multiple relationship tables between the generated current of alternator 30 and the engine 31's rotation speed may be stored in advance according to ambient temperatures of the alternator 30, for example.

As an example is shown in FIG. 5(a), as for the relationship table T1 between the rotation speed NR of the radiator fan 25 or radiator fan electric motor 25m and the temperature TR, when the temperature TR is not greater than first prescribed temperature threshold TR1 (TR≤TR1), the rotation speed NR is constant and is first prescribed rotation speed NR1. Also, when the temperature TR is greater than first temperature threshold TR1 and less than second prescribed temperature threshold TR2 (TR1<TR<TR2), the rotation speed NR is between first rotation speed NR1 and second prescribed rotation speed NR2 (NR1<NR2) and has a positive correlation such as a proportional relationship. Furthermore, when the temperature TR is not less than second temperature threshold TR2 (TR2≤TR), the rotation speed NR is constant and is second rotation speed NR2.

Similarly, as an example is shown in FIG. 5(b), as for the relationship table T2 between the rotation speed NO of the oil cooler fan 26 or oil cooler fan electric motor 26m and the temperature TO, when the temperature TO is not greater than first prescribed temperature threshold TO1 (TO≤TO1), the rotation speed NO is constant and is first prescribed rotation speed NO1. Also, when the temperature TO is greater than first temperature threshold TO1 and less than second prescribed temperature threshold TO2 (TO1<TO<TO2), the rotation speed NO is between first rotation speed NO1 and second prescribed rotation speed NO2 (NO1<NO2) and has a positive correlation such as a proportional relationship. Furthermore, when the temperature TO is not less than second temperature threshold TO2 (TO2≤TO), the rotation speed NO is constant and is second rotation speed NO2.

Also, as an example is shown in FIG. 5(c), as for the relationship table T3 between the rotation speed NA of the aftercooler fan 27 or aftercooler fan electric motor 27m and the temperature TA, when the temperature TA is not greater than first prescribed temperature threshold TA1 (TA≤TA1), the rotation speed NA is constant and is first prescribed rotation speed NA1. Also, when the temperature TA is greater than first temperature threshold TA1 and less than second prescribed temperature threshold TA2 (TA1<TA<TA2), the rotation speed NA is between first rotation speed NA1 and second prescribed rotation speed NA2 (NA1<NA2) and has a positive correlation such as a proportional relationship. Furthermore, when the temperature TA is not less than second temperature threshold TA2 (TA2≤TA), the rotation speed NA is constant and is second rotation speed NA2.

The controller 42 shown in FIG. 1 may store target upper limit rotation speeds of fans 25, 26, and 27 (electric motors 25m, 26m, and 27m) in advance. The target upper limit rotation speeds of fans 25, 26, and 27 (electric motors 25m, 26m, and 27m) may be the same with or different from each other. Also, the target upper limit rotation speed may be preset according to the engine 31's rotation speed. For instance, the target upper limit rotation speed may be preset to the rotation speed corresponding to a prescribed current value that is not greater than the difference of current value necessary for controlling any other electrical components subtracted from the current capacity of the power supply source, i.e. the generated current of the alternator 30, divided by the number of cooling fans, i.e. three in the present embodiment, and also may be set according to necessary current for the fans 25, 26, and 27 (electric motors 25m, 26m, and 27m). Note that the target upper limit rotation speed may be set each time according to the necessary current for the fans 25, 26, and 27 (electric motors 25m, 26m, and 27m).

Figure 2:
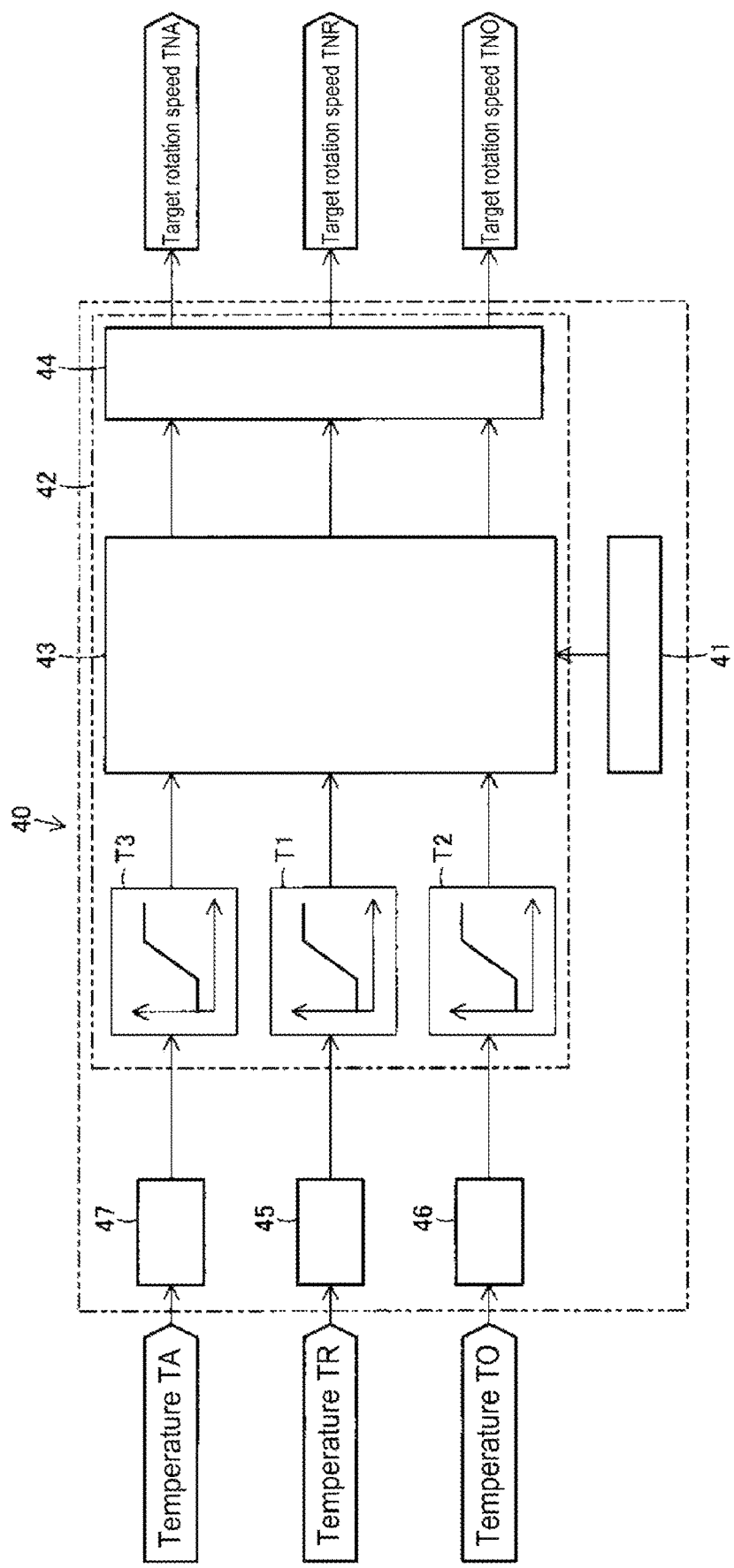
FIG. 2 is an explanatory drawing illustrating the cooling fan control device above.

Also, as shown in FIGS. 1 and 2, the controller 42 comprises a computing means 43 for computing the target rotation speeds TNR, TNO, and TNA of fans 25, 26, and 27; and an output means 44 for outputting control signals for fans 25, 26, and 27 so that the target rotation speeds TNR, TNO, and TNA computed by the computing means 43 can be obtained.

In the present embodiment, the computing means 43 computes the target rotation speeds TNR, TNO, and TNA of fans 25, 26, and 27 by computing the target rotation speeds of electric motors 25m, 26m, and 27m. The computing means 43 computes the target rotation speeds TNR, TNO, and TNA of fans 25, 26, and 27, as long as consumption currents of electric motors 25m, 26m, and 27m for the fans 25, 26, and 27 do not exceed the current capacity of the alternator 30, based on the current capacity of the alternator 30, the sum of necessary currents according to cooled state of heat exchangers to be cooled by the fans 25, 26, and 27, i.e. radiator 15, oil cooler 16, and aftercooler 17, and the air density.

The temperature detected by the temperature sensor as the cooled state of the heat exchanger to be cooled is input into the computing means 43. Preferably, an average of temperatures detected by the temperature sensor is input into the computing means 43. That is to say, the computing means 43 is electrically connected to an averaging means. In the present embodiment, moving averages of temperatures TR, TO, and TA detected by the first to third temperature sensors 35, 36, and 37 are input into the computing means 43. That is to say, the computing means 43 is electrically connected to first to third averaging means 45, 46, and 47. The first to third averaging means 45, 46, and 47 are electrically connected to the first to third temperature sensors 35, 36, and 37, and output the values to the computing means 43 that are computed by averaging the temperatures TR, TO, and TA output from the first to third temperature sensors 35, 36, and 37 over prescribed moving average time. The prescribed moving average time may be preset in advance or optionally set by operator. From now on, the temperatures TR, TO, and TA shall indicate both temperatures detected by the first to third temperature sensors 35, 36, and 37 and temperatures averaged by the first to third averaging means 45, 46, and 47.

Also, as for the air density, the air density detected by a density detection means 41 is input into the computing means 43. The air density may be the value detected by the density detection means 41 or moving average of the value.

Next, an explanation will be provided on an operation of the embodiments shown.

When controlling the rotation speed of fans 25, 26, and 27, first of all in the computing means 43, the controller 42 computes the generated current of the alternator 30 from the engine 31's rotation speed detected by the rotation speed detection means 33 based on the relationship table (FIG. 4) between the generated current of the alternator 30 and the rotation speed of the engine 31. When computing the generated current, the relationship table may be chosen by considering ambient temperature of the alternator 30. In this case, the temperature sensor detecting the ambient temperature of the alternator 30 may be further provided.

Then, the controller 42 subtracts the necessary current value for controlling other electrical components than electric motors 25m, 26m, and 27m from the generated current of alternator 30 computed in the computing means 43. Also, the computing means 43 computes the necessary rotation speed, i.e. the necessary current value, from the relationship tables T1, T2, and T3 (FIGS. 5(a) to 5(c)) between the rotation speeds NR, NO, NA of fans 25, 26, and 27 or electric motors 25m, 26m, and 27m and the temperatures TR, TO, and TA.

After that, in the computing means 43, the controller 42 computes the target rotation speeds TNR, TNO, and TNA of fans 25, 26, and 27 based on the current capacity of the alternator 30 and the sum of necessary currents for fans 25, 26, and 27, i.e. for electric motors 25m, 26m, and 27m. In the present embodiment, the computing means 43 computes the target rotation speeds TNR, TNO, and TNA of fans 25, 26, and 27 based on a magnitude relation between the necessary current value for controlling other electrical components than electric motors 25m, 26m, and 27m subtracted from the generated current of the alternator 30 and the necessary current value for electric motors 25m, 26m, and 27m.

In particular, in the present embodiment, the computing means 43 computes the sum of necessary currents for the fans 25, 26, and 27 (electric motors 25m, 26m, and 27m), and judges whether this sum exceeds the current capacity of the power supply source by comparing this sum computed and current value necessary for controlling any other electrical components, subtracted from the current capacity of the power supply source, i.e. the generated current of the alternator 30. Also, when the sum exceeds the current capacity, the target rotation speeds TNR, TNO, and TNA should be kept as target upper limit rotation speeds and others.

Also, when the sum does not exceed the current capacity, the target rotation speeds TNR, TNO, and TNA should be set as variable necessary rotation speeds. Here, the necessary rotation speed may be limited by target upper limit rotation speed, or the rotation speed greater than the target upper limit rotation speed may be allowed. Also, when computing the target rotation speeds TNR, TNO, and TNA, a priority may be given according to order of weakness to overheating, for example.

Here, when the air density is small such as when the working environment of working machine is at a highland, the cooling power of the heat exchanger may drop. In particular, since specific heat of radiator 15's cooling water is greater than that of hydraulic oil or compressed air, the cooling power of the radiator 15 may drop greater than the oil cooler 16 and aftercooler 17. Also, the engine 31's output drops and a load (air resistance) applied on the cooling fan becomes smaller when the air density is small, so that the smaller the air density is, the smaller the current capacity of the power supply source, i.e. the generated current of the alternator 30, and necessary current of the cooling fan will be.

Therefore, the computing means 43 computes the target rotation speed by correcting at least one of either the relationship table between necessary rotation speed and temperature, necessary current of the cooling fan, or sum of necessary currents of the cooling fans according to the air density detected by the density detection means 41. In the present embodiment, the computing means 43 corrects at least one of either the relationship table between necessary rotation speed and temperature, necessary current of the cooling fan, or sum of necessary currents of the cooling fans, and the current capacity of the power supply source, i.e. the generated current of the alternator 30, according to the air density detected by the density detection means 41. These corrections may be performed according to a formula or table stored in advance or by appropriately selecting one of multiple kinds of corrections stored in advance according to the air density.

Therefore, the smaller the air density is, the greater the computing means 43 sets the upper limit of target rotation speed of the cooling fan, as long as the consumption current of the cooling fan does not exceed the current capacity of the alternator 30. Here, the computing means 43 may set the upper limit of target rotation speed to be computed to the target upper limit rotation speed that is a variable value negatively correlated with the air density, or release a limitation of the target upper limit rotation speed and allow to maximize the target rotation speed as long as the target rotation speed does not exceed the current capacity of the alternator 30. The target upper limit rotation speed as the variable value negatively correlated with the air density should be, for example, a cube root of a ratio of an airflow amount of the cooling fan computed based on the air density to the airflow amount of the cooling fan at a prescribed standard air density (air density in a standard specification) multiplied by the target upper limit rotation speed of the cooling fan at the prescribed standard air density.

In the present embodiment, when the air density detected by the density detection means 41 is greater than the prescribed preset value, the computing means 43 sets the upper limit of target rotation speed to the prescribed target upper limit rotation speed predetermined according to the current capacity of the alternator 30; and when the air density detected by the density detection means 41 is not greater than the prescribed value described above, the means 43 can set the upper limit of target rotation speed to greater than the prescribed target upper limit rotation speed described above. Here, one or multiple values may be prescribed. That is to say, the computing means 43 may divide magnitude of the air density into multiple parts and mitigate the upper limit of target rotation speed or release the limitation of target upper limit rotation speed according to each part of air density divided.

Figure 3:
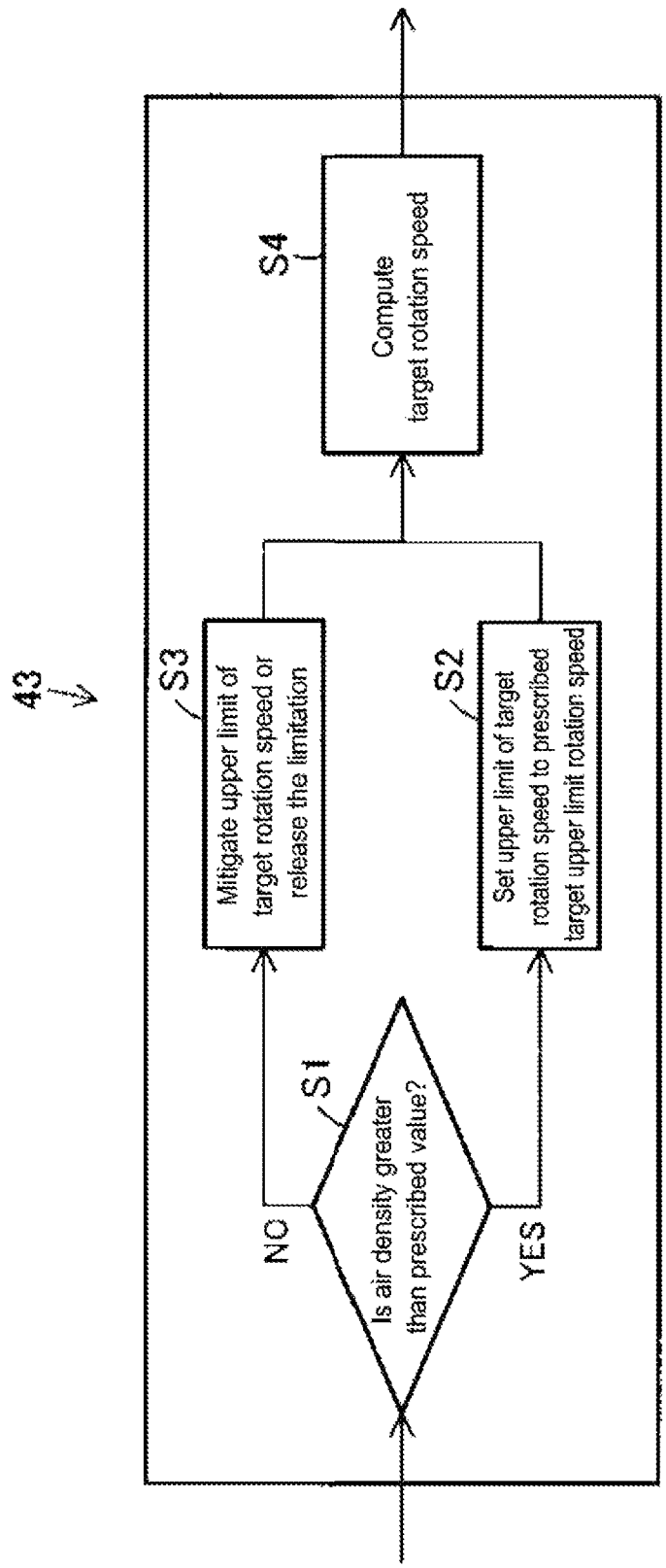
FIG. 3 is the explanatory drawing schematically illustrating a process of the rotation speed setting means in the cooling fan control device above.

In the present embodiment, as shown in FIG. 3, the computing means 43 judges whether the air density detected by the density detection means 41 (FIG. 1) is greater than prescribed value (step S1). When the air density is greater than the prescribed value (step S1 is YES), the upper limit of the target rotation speed is set to the prescribed target upper limit rotation speed predetermined (step S2). When the air density is not greater than the prescribed value (step S1 is NO), the upper limit is mitigated or the limitation is released so that the upper limit of the target rotation speed can be greater than the prescribed target upper limit rotation speed predetermined (step S3). Also, the computing means 43 computes the target rotation speed under the upper limit defined in step S2 or S3 (step S4).

Note that the cooling fan whose upper limit of target rotation speed is changed by the computing means 43 according to the air density (in steps S1 to S3 described above) should be at least the radiator fan 25 whose cooling power changes a lot according to the air density, but the change may be applicable to the oil cooler fan 26 and/or aftercooler fan 27 similarly.

Also, as shown in FIG. 2, the computing means 43 outputs the target rotation speeds TNR, TNO, and TNA computed to the output means 44. The output means 44 outputs control signals corresponding to the target rotation speeds TNR, TNO, and TNA to the electric motors 25*m*, 26*m*, and 27*m* shown in FIG. 1.

As shown above, according to the embodiment, the smaller the air density is, the smaller the load of the cooling fan and its necessary power are, so that the smaller the air density is, the greater the upper limit of target rotation speed of the cooling fan is set, as long as the power capacity of the alternator 30 is not exceeded, thus even if the air density is small and the cooling power of heat exchanger drops, the dropped cooling power of the heat exchanger is covered by setting the upper limit of target rotation speed of the cooling fan greater so that the heat exchanger can be cooled appropriately according to the air density.

In particular, when the air density detected is greater than prescribed value, the upper limit of target rotation speed of the cooling fan is set to the prescribed target upper limit rotation speed predetermined according to the power capacity of the alternator 30, and when the air density detected is not greater than prescribed value, the upper limit of target rotation speed of the cooling fan can be set to greater than the prescribed target upper limit rotation speed, so that, under environments with both relatively greater and smaller air densities, the heat exchanger may be appropriately cooled according to each environment by changing the upper limit of target rotation speed of the cooling fan.

Since the density detection means 41 is the air pressure sensor, when the working environment of the working machine is at a highland in particular, the heat exchanger can be cooled appropriately.

Also, when the cooling fan control device 40 described above is provided, the device can provide the cooling device 11 that can cool the heat exchanger with the cooling fan appropriately according to the air density without enhancing the cooling power of the cooling fan by upsizing the alternator 30 and increasing the power capacity. That is to say, there is no need to develop and install a new large size alternator 30, it is not required to change the design of working machine, thus single cooling device 11 can be used in multiple working environments with different air density at a low cost.

In particular, since the cooling power of the radiator 15 changes a lot according to the change of the air density, the radiator 15 can be appropriately cooled by a setting, where the smaller the air density detected by the density detection means 41 is, the greater the upper limit of target rotation speed TNR of the radiator fan 25 for cooling the radiator 15 will be set.

Note that, in the embodiment described above, the computing means 43 can use the air density detected by the density detection means 41 as the correction when or after computing the target rotation speed.

In addition, the cooling fans are not limited to the fans 25, 26, and 27, and the cooling fan control device 40 is applicable to electric fans for cooling any other objects.

Moreover, the explanation has been provided about multiple cooling fans and heat exchangers, but the cooling fan and heat exchanger can be single respectively.

INDUSTRIAL APPLICABILITY

The present invention has industrial applicability for business owners who are engaged in manufacturing and sales of cooling device to be used in working machine including hydraulic excavator.

The invention claimed is:
1. A cooling device comprising:
an alternator as a power supply source,
a heat exchanger,
a cooling fan configured to be driven by power generated by the alternator and to cool the heat exchanger, and
a cooling fan control device configured to control each rotation speed of the cooling fan, the cooling fan control device comprising:
a density detection means for detecting an air density; and
a rotation speed setting means, where the smaller the air density detected by the density detection means is, the greater an upper limit of target rotation speed of the cooling fan is set, as long as power consumption of the cooling fan does not exceed a power capacity of the power supply source.
2. The cooling device of claim 1, wherein,
when the air density detected by the density detection means is greater than a prescribed value, the rotation speed setting means sets the upper limit of target rotation speed of the cooling fan to a prescribed target upper limit rotation speed predetermined according to the power capacity of the power supply source; and
when the air density detected by the density detection means is not greater than the prescribed value, the means can set the upper limit of target rotation speed of the cooling fan to greater than the prescribed target upper limit rotation speed.
3. The cooling device of claim 1, wherein the density detection means is an air pressure sensor.
4. The cooling device of claim 1, wherein
the heat exchanger comprises a radiator, and
the cooling fan comprises a radiator fan for cooling the radiator.
5. A cooling fan control method for controlling a rotation speed of a cooling fan operably coupled to a cooling fan control device configured to control each rotation speed of the cooling fan, the cooling fan configured to be driven by power supplied from a power supply source and to cool a heat exchanger, wherein the power supply source is an alternator, wherein the cooling fan control device comprises a density detection means for detecting an air density and a rotation speed setting means, where the smaller the air density detected by the density detection means is, the greater an upper limit of target rotation speed of the cooling fan is set, as long as power consumption of the cooling fan does not exceed a power capacity of the power supply source, the method comprising:

detecting an air density, so that the smaller the air density detected is, the greater an upper limit of target rotation speed of the cooling fan is set, as long as power consumption of the cooling fan does not exceed a power capacity of the power supply source.

6. The cooling fan control method of claim 5, wherein, when the air density detected is greater than a prescribed value, the method sets the upper limit of target rotation speed of the cooling fan to a prescribed target upper limit rotation speed predetermined according to the power capacity of the power supply source; and when the air density detected is not greater than the prescribed value, the method can set the upper limit of target rotation speed of the cooling fan to greater than the prescribed target upper limit rotation speed.

\* \* \* \* \*